United States Patent
Bober et al.

(10) Patent No.: US 12,462,019 B2
(45) Date of Patent: Nov. 4, 2025

(54) UTILIZATION OF THE LEAST CODE PRINCIPLE TO STRUCTURE WORKFLOWS

(71) Applicant: Dell Products L.P., Round Rock, TX (US)

(72) Inventors: Roman Bober, Ashdod (IL); Eyal Porges, Jerusalem (IL); Doron Bokobza, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/341,965

(22) Filed: Jun. 27, 2023

(65) Prior Publication Data

US 2025/0005141 A1    Jan. 2, 2025

(51) Int. Cl.
*G06F 21/00* (2013.01)
*G06F 21/55* (2013.01)

(52) U.S. Cl.
CPC .................. *G06F 21/552* (2013.01)

(58) Field of Classification Search
CPC . G06F 21/552; G06F 21/554; G06F 2221/034
See application file for complete search history.

(56) References Cited

U.S. PATENT DOCUMENTS

| | | | |
|---|---|---|---|
| 6,219,805 B1* | 4/2001 | Jones ................. | G06F 11/3616 714/48 |
| 7,076,784 B1* | 7/2006 | Russell ................ | G06F 9/4488 707/999.103 |
| 7,257,630 B2* | 8/2007 | Cole ................... | G02B 6/12023 709/224 |
| 7,487,545 B2* | 2/2009 | Hall ...................... | G06F 21/577 717/124 |
| 7,568,109 B2* | 7/2009 | Powell, Jr. ............. | G06F 8/36 726/32 |
| 7,870,075 B1* | 1/2011 | Sabet .................... | G06F 21/105 705/52 |
| 7,895,650 B1* | 2/2011 | Sobel ................... | G06F 21/554 713/188 |
| 8,214,906 B2* | 7/2012 | Goddard ............... | G06F 11/008 726/25 |
| 8,359,655 B1* | 1/2013 | Pham .................... | G06F 21/10 717/121 |
| 8,732,838 B2* | 5/2014 | Medvedev ............ | G06F 21/577 714/741 |

(Continued)

*Primary Examiner* — Don G Zhao
(74) *Attorney, Agent, or Firm* — WOMBLE BOND DICKINSON (US) LLP

(57) ABSTRACT

Methods, systems, and devices for providing computer implemented services are disclosed. To provide the computer implemented services while using software objects that provide a surface area of attack that may compromise the services, the software objects may be analyzed and modified. To do so, a relative usefulness of computer code, on which the software objects depend, may be established. An action set may then be obtained based on the relative usefulness. The action set may include actions to be performed to modify the software objects. By doing so, the software objects may be modified in a manner that reduces the surface area of attack, thereby reducing a likelihood of compromise to the computer implemented services.

20 Claims, 6 Drawing Sheets

(56) References Cited

U.S. PATENT DOCUMENTS

| | | | | |
|---|---|---|---|---|
| 8,856,935 | B2* | 10/2014 | Kalman | H04L 63/1433 726/25 |
| 8,881,112 | B2* | 11/2014 | Corsetti | G06F 11/3616 717/124 |
| 8,990,930 | B2* | 3/2015 | Burrell | G06F 21/54 726/25 |
| 9,038,030 | B2* | 5/2015 | Rama | G06F 11/008 717/124 |
| 9,448,787 | B2* | 9/2016 | Rosomoff | G06F 8/70 |
| 10,089,463 | B1* | 10/2018 | Katz | G06F 21/50 |
| 10,678,926 | B2* | 6/2020 | Brodie | G06F 21/57 |
| 12,143,410 | B1* | 11/2024 | Murugesan | H04L 63/20 |
| 12,149,553 | B1* | 11/2024 | Fly | H04L 63/1433 |
| 2005/0086530 | A1* | 4/2005 | Goddard | G06F 11/008 726/4 |
| 2005/0283834 | A1* | 12/2005 | Hall | G06F 21/577 713/188 |
| 2007/0282951 | A1* | 12/2007 | Selimis | H04L 67/75 709/205 |
| 2009/0222883 | A1* | 9/2009 | Huo | G06F 21/10 726/1 |
| 2009/0328223 | A1* | 12/2009 | Medvedev | G06F 21/577 726/25 |
| 2010/0205673 | A1* | 8/2010 | Burrell | G06F 21/577 726/25 |
| 2012/0255020 | A1* | 10/2012 | Stoneham | G06F 21/577 726/25 |
| 2014/0033176 | A1* | 1/2014 | Rama | G06F 11/3688 717/124 |
| 2014/0317591 | A1* | 10/2014 | Rosomoff | G06F 11/3668 717/101 |
| 2020/0356668 | A1* | 11/2020 | Hart | G06F 21/554 |
| 2021/0367961 | A1* | 11/2021 | Kuppa | G06F 40/205 |
| 2022/0012341 | A1* | 1/2022 | Sarkar | G06F 21/562 |
| 2022/0108026 | A1* | 4/2022 | Ortiz | G06F 12/1408 |
| 2023/0071976 | A1* | 3/2023 | Lee | G06F 11/301 |
| 2024/0020624 | A1* | 1/2024 | Williams | H04L 9/3213 |
| 2024/0070266 | A1* | 2/2024 | Chai | G06F 21/14 |
| 2024/0275842 | A1* | 8/2024 | Cooney | H04L 63/0807 |
| 2024/0330283 | A1* | 10/2024 | Li | G06F 16/2448 |
| 2024/0419791 | A1* | 12/2024 | Croak | G06F 21/554 |
| 2025/0005141 | A1* | 1/2025 | Bober | G06F 21/552 |

* cited by examiner

UTILIZATION OF THE LEAST CODE PRINCIPLE TO STRUCTURE WORKFLOWS

FIELD

Embodiments disclosed herein relate generally to device management. More particularly, embodiments disclosed herein relate to systems and methods for managing device security.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
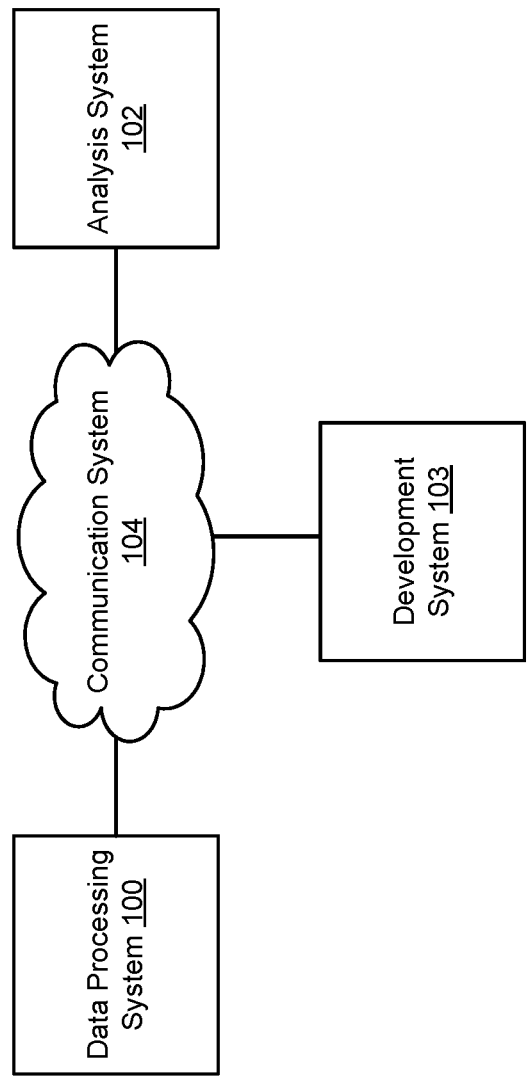
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing, at least in part, computer implemented services. To provide the services, a software object may be used. The software object may perform functions that correspond to different portions of computer code on which the software object is based. These functions may be performed to facilitate various functionalities of the system (to which the software object is deployed), thereby allowing the system to provide the computer implemented services.

However, the system may have a surface area of attack based on a number of software objects deployed to the system. For example, a software object may provide a number of possible points of vulnerability (e.g., attack vectors, avenues for unauthorized use, etc.) where an unauthorized user may access the data processing system. Thus, having these possible points may provide a number of avenues for unintended/undesired operation of the system, thereby compromising the system and the services.

To manage the system and enhance security of the system, the number of software objects (and/or portions thereof) deployed to the system may be selectively reduced to reduce the surface area of attack.

By reducing the surface area of attack, a likelihood of the system and/or services being compromised due to security attacks and/or undesired operation of software objects may also be reduced. This selective reduction may be performed based on a relative usefulness of the software objects (and functions thereof) to a client (or otherwise authorized user of the data processing system).

In an embodiment, a method is provided for managing a data processing system.

The method may include obtaining a log for a software object, the software object being adapted to perform functions that correspond to different portions of computer code on which the software object is based, and the log specifying events regarding the software object that occur during a period of time; obtaining a functional flow based on the log, the functional flow indicating an order in which at least one function of the functions is performed by the software object during the period of time; obtaining an analysis of function use based on the functional flow, the analysis indicating a respective frequency of use of each function of the at least one function; obtaining weightings corresponding to the different portions of the computer code based on the analysis of function use, the weightings corresponding to the different portions of the computer code and indicating the frequencies of use of the functions corresponding to the different portions of the computer code; and initiating performance of an action set based on the weightings to update operation of the data processing system.

Obtaining the log for the software object may include monitoring activity of the software object over the period of time to obtain the events and corresponding timestamps for when each of the events is obtained; and recording the events and the corresponding timestamps to obtain the log.

A first event of the events may indicate performance of at least one function of the functions.

A second event of the events may not indicate that any of the functions were performed.

A combination that may include at least a third event of the events and a fourth event of the events may indicate performance of one function of the functions.

A function of the functions may be a data processing procedure that when completed provides a data processing outcome as part of the functional flow of the software object.

Obtaining the functional flow may include processing the events of the log using a set of event processing rules to identify occurrences of performances of the function by the software object; and temporally ordering the occurrences based on the timestamps to obtain the functional flow.

Obtaining the analysis of the function use may include identifying a number of times each of the functions is present in the functional flow to obtain a frequency distribution of the functions.

Obtaining the weightings may include obtaining mappings of the portions of the different portions of computer code corresponding to the functions; and obtaining a frequency distribution of the different portions of the computer code using the frequency distribution of the functions and the mappings.

The action set may include identifying at least one portion of the computer code based on a frequency distribution of the different portions of the computer code; updating the at least one portion of the computer code to obtain new computer code; obtaining an updated software object based on the new computer code; and updating operation of the data processing system using the updated software object.

Identifying the at least one portion of the computer code may include rating the different portions of the computer code based on the frequency distribution of the different portions of the computer code using a rating system, wherein the rating system specifies at least three ratings for the different portions of the computer code based on the frequency of use of each of the different portions of the computer code.

The action set may further include identifying at least one portion of the computer code based on the frequency distribution of the different portions of the computer code; and distributing information regarding the as least one portion of the computer code to an entity.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and/or quantity of computer implemented services. For example, the computer implemented services may include data storage services, instant messaging services, database services, and/or any other type of service that may be implemented with a computing device.

To provide the computer implemented services, a software object may be used. The software object may perform functions that correspond to different portions of computer code on which the software object is based. These functions may be performed to facilitate various functionalities of a data processing system (to which the software object is deployed), thereby allowing the data processing system to provide the computer implemented services.

For example, a software object may be implemented using a computer program (e.g., a word processing program, an internet browser, an operating system, a gaming application, etc.) deployed to the data processing system. The data processing system may use the computer program to provide a service (e.g., word processing) based on one or more functions performed by the software object. Furthermore, it will be appreciated that a computer program may include any quantity of software objects, and the software objects may perform any type and/or quantity of functions.

To perform these functions, the different portions of the computer code may be read and executed by a processor of the data processing system. Moreover, a portion of the different portions may be read and executed to perform a function of the functions that corresponds to the portion.

In doing so, corresponding functions may be performed by software objects to provide the computer implemented services.

However, the data processing system may have a surface area of attack based on a number of software objects deployed to the data processing system. For example, a software object may provide a number of possible points of vulnerability (e.g., attack vectors, avenues for unauthorized use, etc.) where an unauthorized user may access the data processing system. These possible points may account for at least a portion of the surface area of attack. Therefore, if the number of software objects deployed to the data processing system is increased, the number of possible points may also increase, thereby increasing the surface area of attack. Thus, having a large surface area of attack (e.g., by having a large number of software objects) may provide a large number of avenues for unintended/undesired operation of the data processing system, thereby compromising the system.

The large surface area of attack may lead to compromise of the system by increasing a likelihood of (i) security attacks on the data processing system, (ii) potential coding errors experienced by the data processing system, and/or (iii) other undesired effects on the data processing system. Consequently, the computer implemented services may be compromised based on (i) the security attacks (which may be facilitated by potential coding errors), and/or (ii) undesired operation of software objects due to coding errors in the implementation of the software objects.

In general, embodiments disclosed herein may provide methods, systems, and/or devices for managing a data processing system. Moreover, embodiments disclosed herein provide for management of computer code in a manner that enhances security of the data processing system.

To enhance the security, the number of software objects (and/or portions thereof) deployed to the data processing system may be selectively reduced to reduce the surface area of attack. By reducing the surface area of attack, a likelihood of the computer implemented services being compromised due to security attacks and/or undesired operation of software objects may also be reduced. This selective reduction may be performed based on a relative usefulness of the software objects (and functions thereof) to a client (or otherwise authorized user of the data processing system).

To establish the relative usefulness, a frequency (e.g., of performance) distribution for functions performable by the software objects may be obtained. To do so, a functional flow may be identified for the software objects.

To identify the functional flow, events regarding the software objects may be monitored. The monitored events may be recorded to obtain a log for the software objects, and the functional flow may be identified based on the log and a set of event processing rules.

Once identified, the functional flow may be analyzed to obtain the frequency distribution of the functions. This frequency distribution may indicate a frequency in which functions performable by the software objects are performed during a period of time (e.g., the amount of time during which the software objects are monitored).

To further establish the relative usefulness, a frequency distribution for the software objects may be obtained based on (i) the different portions of the computer code corresponding with the functions and (ii) the frequency distribution of the functions. Accordingly, to obtain the frequency distribution of the software objects, the different portions of the computer code may be mapped to corresponding functions (e.g., using a look up table). Based on the mapping and the frequency distribution of the functions, the frequency distribution of the software objects may be obtained to establish the relative usefulness of the software objects.

Thus, to selectively reduce the number of software objects (and/or portions thereof) deployed to the data processing system, the relative usefulness may be used to remove and/or otherwise modify at least a portion of the software objects. To do so, an action set may be initiated. This action set may include (i) rank ordering of the software objects (and/or the portions thereof) based on the relative usefulness, (ii) selecting some software objects (and/or portions thereof) based on the rank order, and (iii) modifying and/or removing at least a portion of the selected software objects (and/or the portions thereof).

Figure 2A:
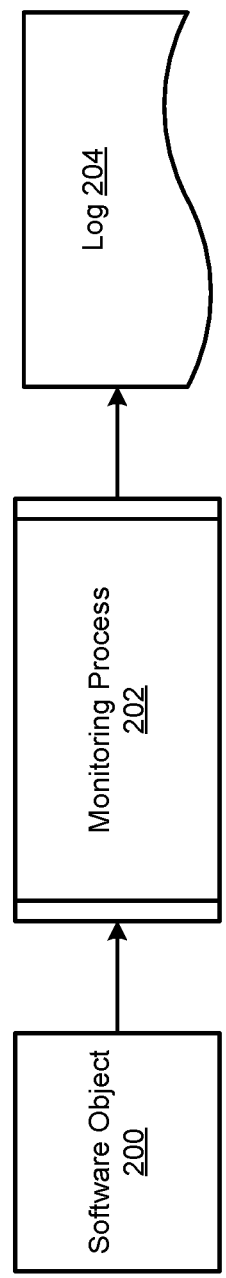
FIGS. 2A-2C show data flow diagrams showing management of data in accordance with an embodiment.
Figure 2B:
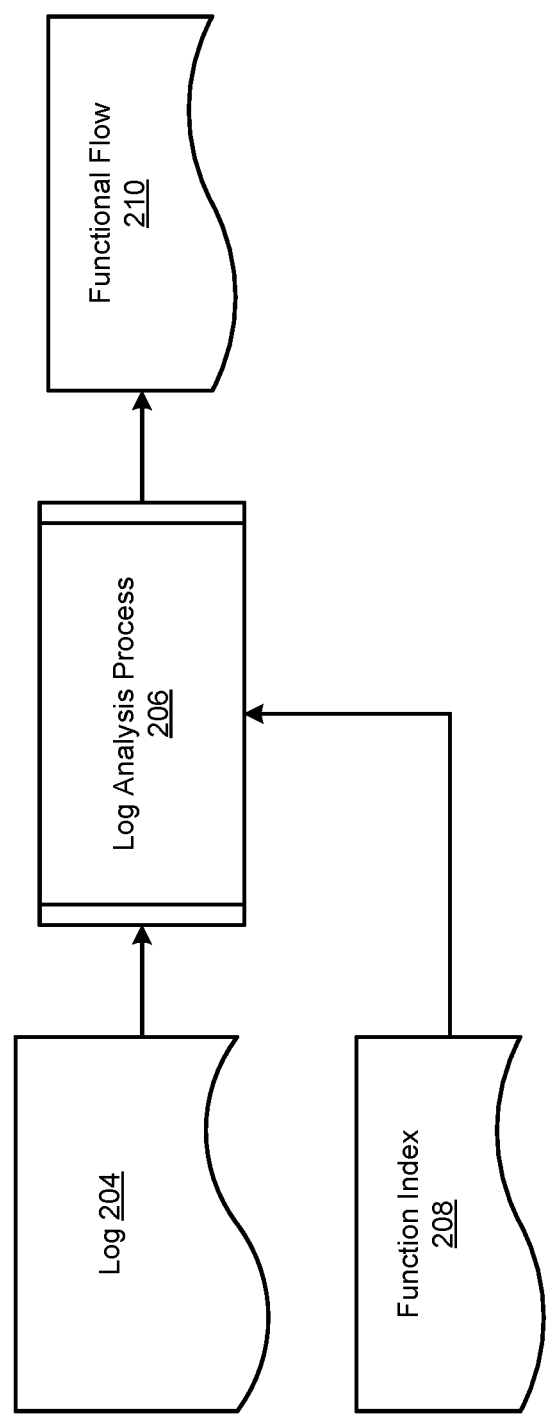
Figure 2C:
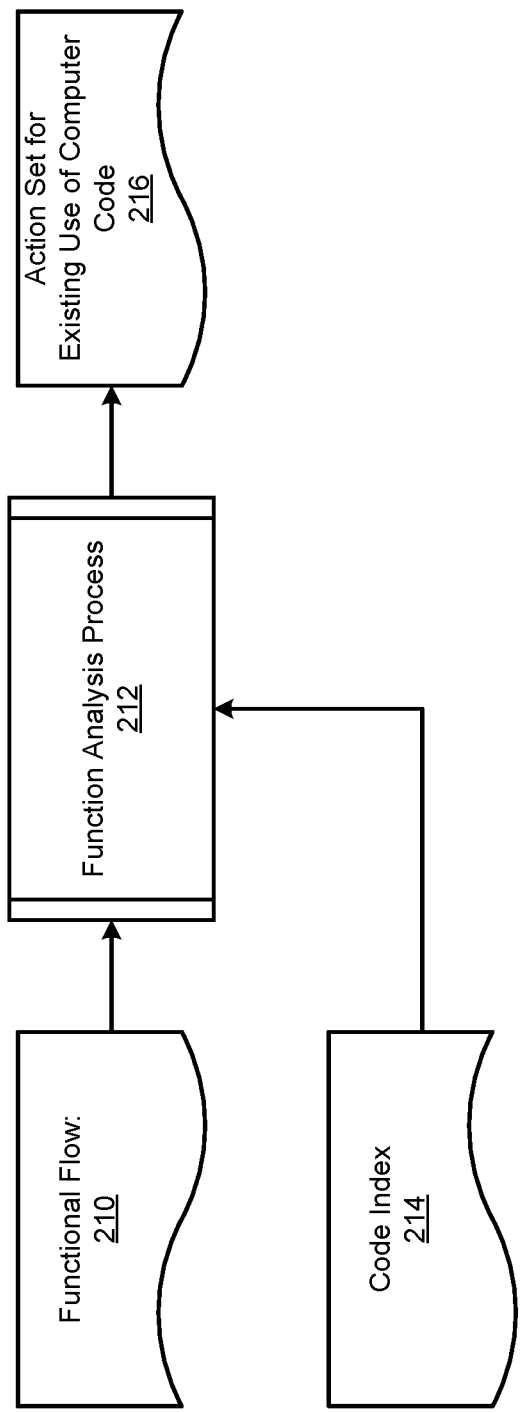

For example, software objects (and/or portions thereof) that are labelled as being under a threshold for acceptable relative usefulness (e.g., labelled as not useful based on (i) the rank ordering and (ii) a set of rules indicating a desired threshold for relative usefulness, discussed further with regard to FIG. 2C) may be removed and/or otherwise modified to reduce the surface area of attack. By selectively reducing the number of software objects (and/or portions thereof) deployed to the data processing system, a likelihood of compromising security and/or operation of the data processing system may be decreased.

Accordingly, systems in accordance with embodiments disclosed herein may enhance (at least in part) the security of the data processing system.

To provide the above noted functionality, the system of FIG. 1 may include data processing system (DPS) 100, analysis system 102, development system 103, and communication system 104. Each of these is discussed below.

As previously discussed, DPS 100 may provide computer implemented services. To do so, one or more software objects may be used (e.g., the software objects may be deployed to DPS 100 for use by DPS 100). These software objects may be adapted to perform functions that correspond to different portions of computer code on which the software objects are based. These functions may be performed to facilitate various functionalities of DPS 100, thereby allowing DPS 100 to provide the computer implemented services.

However, while deployed to DPS 100, the software objects may provide a number of possible points (e.g., attack vectors, avenues for unauthorized use, etc.) through which (i) an unauthorized user may access DPS 100, and/or (ii) undesired operation of software objects may be initiated due to coding errors in the implementation of the software objects. These possible points may thereby compromise security and/or operation of DPS 100 by accounting for at least a portion of a surface area of attack for DPS 100.

To reduce the surface area of attack, and thereby reduce a likelihood of compromise to DPS 100, analysis system 102 may be used. Analysis system 102 may establish a relative usefulness for the software objects, previously discussed. The relative usefulness may be established using logs and/or other data structures based on monitoring of the software objects. Refer to FIG. 2A for additional details regarding monitoring software objects.

Based on the established relative usefulness, analysis system 102 may initiate an action set (e.g., as previously discussed) to remove and/or otherwise modify the software objects (and/or portions thereof) to reduce the surface area of attack while retaining useful functionality of data processing system 100. Various actions of the actions set may be performed by various components of the system of FIG. 1. Refer to FIGS. 2B-2C for additional details regarding identification of the relative usefulness of software objects.

To remove and/or otherwise modify the software objects (and/or portions thereof), development system 103 may be used (e.g., as part of the action set). Development system 103 may be a source (e.g., a developer) of the software objects. Consequently, development system 103 may be adapted to generate, modify, and/or remove different portions of the computer code on which the software objects are based. Refer to FIG. 2C for additional details regarding actions that may be performed based on the relative useful of software objects.

Figure 3:
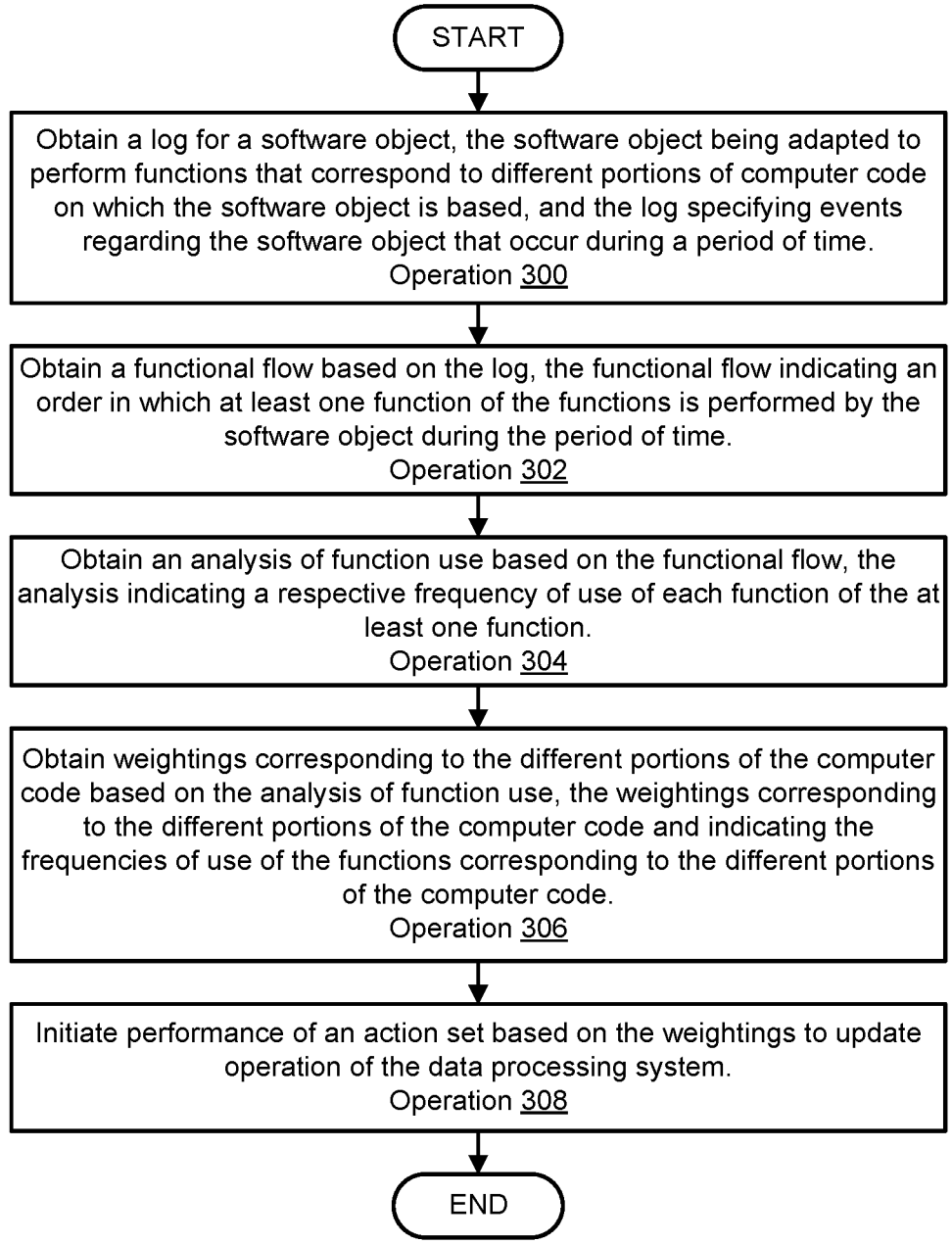
FIG. 3 shows a flow diagram illustrating a method for managing data in accordance with an embodiment.

When performing their functionality, data processing system (DPS) 100, analysis system 102, and/or development system 103 may perform all, or a portion, of the methods and/or actions described in FIGS. 2A-3.

Figure 4:
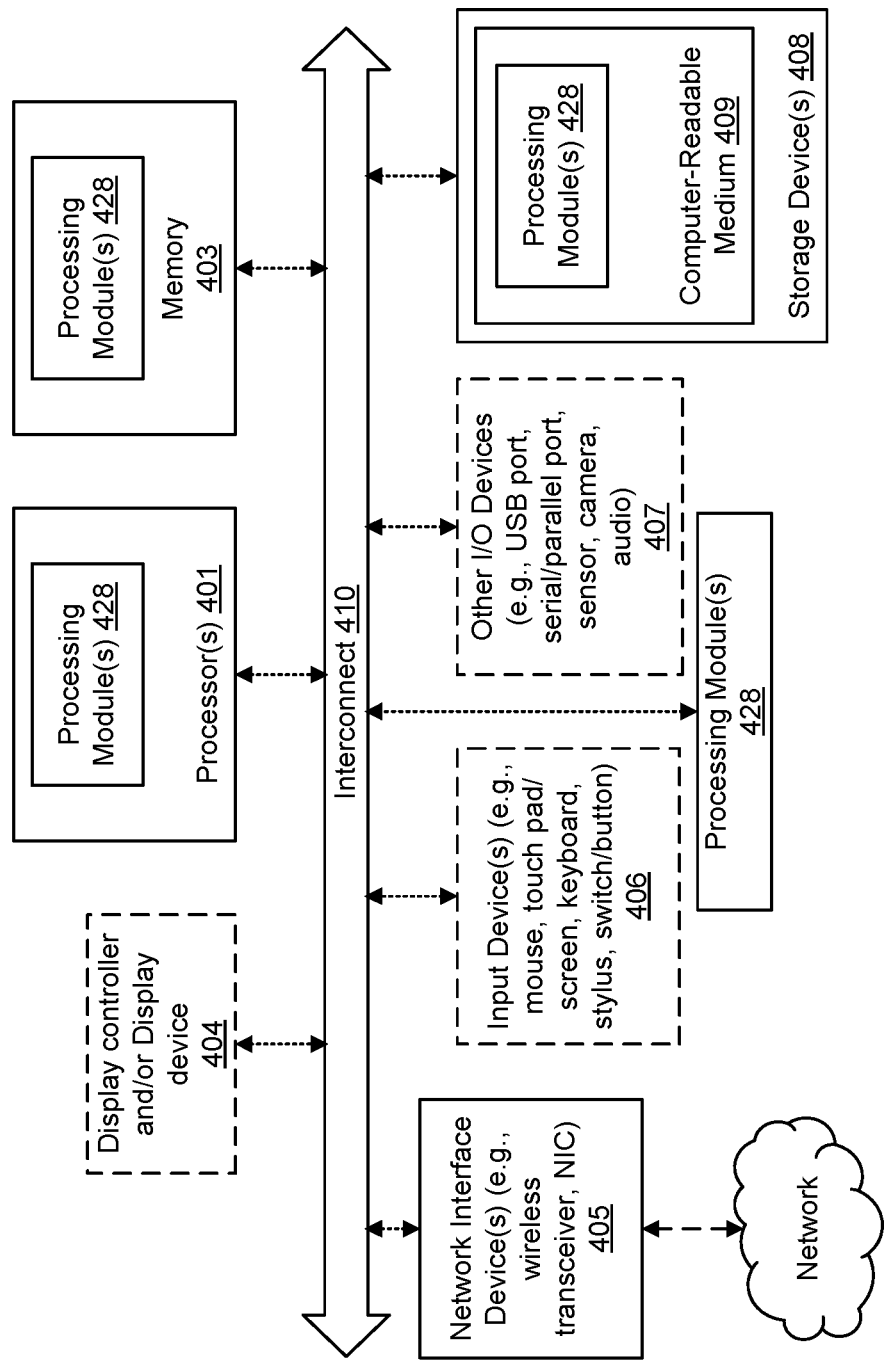
FIG. 4 shows a block diagram illustrating a data processing system in accordance with an embodiment.

DPSs 100, analysis system 102, and/or development system 103 may be implemented using one or more computing devices such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. Refer to FIG. 4 for additional details regarding computing devices.

Any of the components illustrated in FIG. 1 may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, while illustrated as being separate, the functionalities of any of the components shown in FIG. 1 may be performed via a single device or divided among any number of devices.

To further clarify embodiments disclosed herein, data flow diagrams in accordance with an embodiment are shown in FIGS. 2A-2C. These data flow diagrams may illustrate how data is obtained and used within the system of FIG. 1.

Turning to FIG. 2A, a data flow diagram illustrating a monitoring process to obtain a log for a software object in accordance with an embodiment is shown. The log may be obtained to identify the relative usefulness of software object 200. The log may include information regarding, for example, activity of a software object over time.

For example, software object 200 may be deployed to DPS 100. While deployed, software object 200 may perform various activities.

To obtain a log (e.g., 204) for software object 200, software object 200 may be subjected to monitoring process 202. During Monitoring process 202, activity of software object 200 may be monitored over a period of time (e.g., a week, month, year, etc.). The activity may include various events regarding software object 200, and the various events may occur at specific times throughout the period of time.

Once identified, various information regarding the observed events may be recorded (e.g., timestamps for the specific times in which the events occur) to obtain log 204.

For example, a user may use a word processing program when using a computer (e.g., DPS 100). Assume, for simplicity of discussion, that the program includes a single software object (e.g., 200). To obtain a log for the program, events regarding the program may be monitored over the course of a week. These events may include (i) starting the program, (ii) generating a word document, (iii) typing symbols (e.g., letters, punctuations, etc.) into the program, (iv) deleting symbols, (v) changing settings for the symbols, (vi) saving a word document to storage, (vii) changing accessibility settings to customize how the user interacts with the program, and (viii) ending the program.

During the week, each occurrence of a relevant event (e.g., any one event of the events regarding the program) may be recorded (e.g., with a corresponding timestamp) as each relevant event occurs to obtain a log (e.g., 204). For example, once recorded, the log may indicate that (i) the program was started 26 times, (ii) a word document was generated 3 times, (iii) symbols were typed into the program 24,266 times, (iv) symbols were deleted 2,677 times, (v) settings for the symbols were changed 345 times, (vi) a word document was saved 1,856 times, (vii) the accessibility settings were never changed, and (viii) the program was ended 26 times.

Thus, log 204 may specify events regarding software object 200 that occur during the period of time. Furthermore, because of the timestamps (and/or by other means), log 204 may indicate an order of activity (e.g., a temporal order in which the events occurred).

The content of log 204 may be usable to estimate the relative usefulness of software objects that constitute the word processing program. The relative usefulness may be identified through analysis of the log.

Turning to FIG. 2B, a data flow diagram illustrating a log analysis process to obtain a functional flow for a software object (e.g., 200) in accordance with an embodiment is shown. The functional flow may be obtained to identify usefulness of different software objects, as will be discussed further with respect to FIG. 2B.

To obtain the functional flow (e.g., 210) for log 204, log 204 may be ingested by log analysis process 206. During log analysis process 206, the events from log 204 may be analyzed to identify invocation of different functions of software objects. The identified function invocations may be used to populate functional flow 210. By doing so, functional flow 210 may indicate a frequency of use of the functions performed during the period of time.

To identify the invocations of the different functions of software objects, log analysis process 206 may utilize function index 208. Function index 208 may identify which function(s) of the functions performable by software object 200 were performed during the period of time (e.g., the monitored week) based on the content of log 204. For example, function index 208 may be implemented using a look up table that specifies functions that were performed to cause the events regarding software object 200 that are recorded in log 204 to have occurred. For example, a lookup for one or more events from log 204 may be performed to identify which functions of the software object were invoked to cause the one or more events to be recorded in log 204.

When populating functional flow 210, a temporal ordering for the identified invocations of the functions may also be added, which may correspond to the temporal order in which the events occurred (e.g., using the timestamps).

Thus, by (i) identifying one or more functions performed during the period of time, and (ii) temporally ordering each occurrence of a function of the identified functions, the functional flow 210 may be obtained and a frequency of use for each function may be known.

For example, the log may include the events that occurred during the monitored week as discussed in FIG. 2A with regard to the user and the word processing program. Function index 208 may be used to identify what function(s) performable by the program were performed to cause each respective event of the events to occur during the monitored week.

By identifying what functions were performed to cause each respective event and identifying when each of these functions were performed to cause each respective event, a functional flow may be obtained for the program, the functional flow indicating a frequency of use for each of the functions performable by the program. For example, due to the accessibility settings never being changed during the monitored week, one or more functions responsible for initiating and/or facilitating a change to accessibility settings may be established as having a low frequency of use. This low frequency of use may be indicated by the functional flow obtained for the program (e.g., 210).

The resulting functional flow (e.g., 210) may be used to identify the usefulness of software objects which may be used in turn to identify actions to be performed to manage the surface area for attack of a data processing system.

Turning to FIG. 2C, a data flow diagram illustrating a function analysis process to obtain an action set for removing and/or otherwise modifying one or more portions of a software object (e.g., 200) in accordance with an embodiment is shown. The function analysis process may analyze a functional flow to identify the relative usefulness of software objects. The relative usefulness of the software objects may be used to identify an action set for managing surface area of attack of a data processing system.

To obtain the action set (e.g., 216), functional flow 210 may be ingested by function analysis process 212. During function analysis process 212, the relative usefulness of software objects may be identified, and used as a basis for selecting actions of the action set (e.g., 216).

When ingested, functional flow 210 may include an order of functions invoked. Each function invocation may be mapped to a corresponding software object (and/or portions thereof) using code index 214 to identify the relative frequency of use of different software objects (and/or portions thereof).

Code index 214 may be implemented using a look up table (or other data structure) that specifies what portions of the computer code must be executed to perform corresponding functions performable by software object 200.

The relative frequency of use of the software objects may be used to establish weightings corresponding to the identified portions. The weightings may correspond to the different portions of the computer code and may depend on the frequency of use of the functions corresponding to the different portions. Thus, a frequency of use for the different portions may be obtained to determine the relative usefulness of software object 200.

For example, assume the weightings are on a scale between a value of 0 and a value of 1. A weighting of 0 may indicate a very low frequency of use and/or usefulness, and a weighting of 1 may indicate a high frequency of use and/or usefulness. Returning to the word processing program example discussed with respect FIGS. 2A and 2B, the functional flow for the program may indicate weightings between 0.5 and 1 for all portions of code corresponding to all of the functions performed during the monitored week. However, the functional flow may indicate a weighting of 0 for portions of code corresponding to the functions with a low frequency of use, such as for the one or more functions responsible for initiating and/or facilitating a change to accessibility settings. Thus, the relative usefulness of different software objects of the program may be established.

Based on the weightings (e.g., and the establish relative usefulness) of software object 200, the action set for existing use of computer code 216 may be obtained. This action set may be used to reduce the surface area of attack provided by software object 200 (thereby reducing the likelihood of compromise to DPS 100). To do so, the action set may specify instructions and/or recommendations to remove and/or otherwise modify one or more portions of the computer code on which software object 200 depends (e.g., one or more portion of software object 200).

The actions set may be established via automated, semiautomated, and/or manual means. For example, if established automatically, a set of rules or other system may ingest the weightings and add actions to the action set based on the weightings and corresponding software objects/portions of computer code. In contrast, if established manually, information regarding the weightings and corresponding software objects/portions of computer code may be provided to an administrator, subject matter expert, and/or other person that may add the actions to the action set. The semiautomated approach may include, for example, automated addition of actions with review/approval by a subject matter expert. It will be appreciated that the actions of the action set may be established in different manners without departing from embodiments disclosed herein.

The action set may include, for example, (i) identifying at least one portion of the computer code based on the weightings, (ii) updating the at least one portion of the computer code to obtain new computer code, (iii) obtaining an updated software object (e.g., an updated version of software object 200) based on the new computer code, and/or (iv) updating operation of the data processing system using the updated software object.

The action set may also include distributing information (e.g., recommendations) regarding the as least one portion of the computer code to an entity (e.g., development system 103 in FIG. 1) rather than updating the at least one portion of the computer code to obtain new computer code. The entity may update or otherwise modify computer code based on the provided information so that updated software objects may be deployed to data processing systems.

To identify the at least one portion of the computer code, the different portions of the computer code may, for example, be rated (e.g., labelled) based on the weightings (e.g., a value of 0 being labeled as a low frequency of use and/or low usefulness, and a value of 1 being labeled as a high frequency of use and/or high usefulness, as previously discussed).

Thus, by (i) rank ordering of the software objects (and/or the portions thereof) based on the relative usefulness, (ii) selecting some software objects (and/or portions thereof) based on the rank order, and (iii) modifying and/or removing at least a portion of the selected software objects (and/or the portions thereof), the surface area of attack provided by software object 200 may be reduced. This reduction may thereby reduce the likelihood of compromise to DPS, and as such, reduce the likelihood of compromise to the computer implemented services.

It will be appreciated that while illustrated and described using a limited number of data structures and processes, the data flow diagrams of FIGS. 2A-2C in accordance with an embodiment may include fewer, additional, and/or different data structures and/or processes than those discussed herein.

As discussed above, the components (depicted using data structures and data flows) of FIGS. 1-2C may perform various methods for managing a data processing system in a manner that enhances security and/or operation of the data processing system.

To further clarify embodiments disclosed herein, a flow diagram in accordance with an embodiment is shown in FIG. 3. This flow diagram shows a method that may enhance security and/or operation of a data processing system. While described with respect to software objects, it will be understood that embodiments disclosed herein are broadly applicable to different use cases (e.g., different data management cases) as well as different types of data processing systems than those described below.

In the flow diagram discussed below, any of the operations may be repeated, performed in different orders, omitted, and/or performed in parallel with or a partially overlapping in time manner with other operations.

Turning to FIG. 3, a flow diagram illustrating a method for managing a data processing system in a manner that enhances security and/or operation of the data processing system in accordance with an embodiment is shown. The method may be performed by, for example, a data processing system, an analysis system, a development system, and/or other components illustrated in FIGS. 1-2C.

At operation 300, a log for a software object is obtained. The software object may be adapted to perform functions that correspond to different portions of computer code on which the software object is based. The log may specify events regarding the software object that occur during a period of time. The log for the software object may be obtained by reading the log from storage, receiving the log from another device, generating the log, and/or via other methods.

The log for the software object may be generated by monitoring activity regarding the software object over the period of time (e.g., a day, week, month, year, etc.) and recording activity such as events observed during the period of time. Refer to the discussion regarding FIG. 2A for additional details regarding generating a log. Thus, by recording the events (e.g., with corresponding timestamps of when the events took place), the log may be obtained.

The activity may be monitored by establishing an agent that identifies activity related to the software object, by instructing a watch service to track the activity of the software object, and/or via other methods. The events may be recorded by populating one or more data structures with information regarding the events.

At operation 302, a functional flow is obtained based on the log. The functional flow may indicate an order in which at least one function of the functions is performed by the software object during the period of time. The functional flow may be obtained by processing the events of the log using a set of event processing rules to identify occurrences of performances of the function by the software object; and temporally ordering the occurrences based on the timestamps to obtain the functional flow.

The events may be processed and/or the occurrences may be temporally ordered by ingesting the log into a log analysis process as discussed with respect to FIG. 2B. The log analysis process may utilize set of event processing rules. By doing so, the events included in the log may be mapped to corresponding functions of the software object, where a corresponding function of an event may be invoked to initiate and/or facilitate performance of the event.

Thus, by using (i) the mapping between the events and corresponding functions and/or (ii) other information from the log (e.g., the timestamps of when the events occurred during the period of time), the functional flow for the software object may be obtained.

At operation 304, an analysis of function use is obtained based on the functional flow. The analysis may indicate a respective frequency of use of each function of the at least one function. The analysis of function use may be obtained by identifying a number of times each of the functions is present in the functional flow to obtain a frequency distribution of the functions. The number of times may be identified by analyzing the functional flow as discussed in FIG. 2C to obtain the frequency of use of the functions.

Thus, by having the functional flow indicate an order in which at least one function of the functions is performed by the software object during the period of time, the functional flow may be used to obtain the analysis of function use that indicates a frequency of use of the functions.

At operation 306, weightings corresponding to the different portions of the computer code are obtained based on the analysis of function use. The weightings may correspond to the different portions of the computer code and indicate the frequencies of use of the functions corresponding to the different portions of the computer code.

The weightings may be obtained by obtaining mappings of the portions of the different portions of computer code corresponding to the functions; and obtaining a frequency distribution of the different portions of the computer code using the frequency distribution of the functions and the mappings. The mappings may be obtained using the frequency distribution by mapping the functions to the portions of the computer code as discussed with regard to FIG. 2C.

Accordingly, by using (i) the mapping between the functions and corresponding portions of the computer code and/or (ii) the frequencies of use of the functions, the weightings for the portions of the computer code may be obtained.

The weightings, as discussed with regard to FIG. 2C, may be used to identify a frequency of use of the portions of the computer code. For example, a weighting of a single portion of the computer code may be used to identify how often the single portion is read and executed to initiate (and/or facilitate) a corresponding function. Thus, the weighting may be used to establish a level of usefulness of the single portion of the computer code and may be used to determine whether the single portion should be modified to reduce the surface area of attack (and if so, how the single portion should be modified).

At operation 308, performance of an action set is initiated based on the weightings to update operation of the data processing system. Performance of the action set may be initiated by using the weightings, discussed above and with regard to FIG. 2C.

For example, the weightings may be used to identify the single portion of the computer code. The single portion may be read and executed a nominal number of times compared to other portions of the computer code. Thus, the single portion may be established as having a low degree of usefulness, and as such may be identified as needing modification to reduce the surface area of attack. Therefore, the action set may include (i) updating the single portion to obtain new computer code, and (ii) obtaining an updated software object based on the new computer code. The data processing system may then be updated using the updated software object, thereby reducing the surface area of attack of the data processing system.

The method may end following operation 308.

Using the method illustrated in FIG. 3, a system in accordance with an embodiment may enhance security and/or operation of a data processing system by reducing a surface area of attack for the data processing system. Thus, the components (depicted using data structures and data flows) of FIGS. 1-2C may perform at least a portion of the method to manage the data processing system in a manner that enhances the security and/or the operation of the data processing system.

Any of the components illustrated and/or discussed in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:
   obtaining a log for a software object, the software object being adapted to perform functions that correspond to different portions of computer code on which the software object is based, and the log specifying events regarding the software object that occur during a period of time;
   obtaining a functional flow based on the log, the functional flow indicating an order in which at least one function of the functions is performed by the software object during the period of time;
   obtaining an analysis of function use based on the functional flow, the analysis indicating a respective frequency of use of each function of the at least one function, and the analysis being obtained by, at least, identifying a number of times each of the functions is present in the functional flow to obtain a frequency distribution of the functions;
   obtaining weightings corresponding to the different portions of the computer code based on the analysis of function use, the weightings corresponding to the different portions of the computer code and indicating the respective frequency of use of each function of the functions corresponding to the different portions of the computer code; and
   performing an action set based on the weightings to update operation of the data processing system.

2. The method of claim 1, wherein obtaining the log for the software object comprises:
   monitoring activity of the software object over the period of time to obtain the events and corresponding timestamps for when each of the events is obtained; and
   recording the events and the corresponding timestamps to obtain the log.

3. The method of claim 2, wherein a first event of the events indicates performance of at least one function of the functions.

4. The method of claim 3, wherein a second event of the events does not indicate that any of the functions were performed.

5. The method of claim 4, wherein a combination comprising at least a third event of the events and a fourth event of the events indicates performance of one function of the functions.

6. The method of claim 1, wherein a function of the functions is a data processing procedure that when completed provides a data processing outcome as part of the functional flow of the software object.

7. The method of claim 2, wherein obtaining the functional flow comprises:
   processing the events of the log using a set of event processing rules to identify occurrences of performances of the function by the software object; and
   temporally ordering the occurrences based on the timestamps to obtain the functional flow.

8. The method of claim 1, wherein obtaining the weightings comprises:
   obtaining mappings of the portions of the different portions of computer code corresponding to the functions; and
   obtaining a frequency distribution of the different portions of the computer code using the frequency distribution of the functions and the mappings.

9. The method of claim 1, wherein the action set comprises:
   identifying at least one portion of the computer code based on a frequency distribution of the different portions of the computer code;
   updating the at least one portion of the computer code to obtain new computer code;

obtaining an updated software object based on the new computer code; and updating operation of the data processing system using the updated software object.

10. The method of claim 9, wherein identifying the at least one portion of the computer code comprises:

rating the different portions of the computer code based on the frequency distribution of the different portions of the computer code using a rating system, wherein the rating system specifies at least three ratings for the different portions of the computer code based on the frequency of use of each of the different portions of the computer code.

11. The method of claim 1, wherein the action set comprises:

identifying at least one portion of the computer code based on a frequency distribution of the different portions of the computer code; and distributing information regarding the as least one portion of the computer code to an entity.

12. A non-transitory machine-readable medium having instructions stored therein, which when executed by a processor, cause the processor to perform operations for managing a data processing system, the operations comprising:

obtaining a log for a software object, the software object being adapted to perform functions that correspond to different portions of computer code on which the software object is based, and the log specifying events regarding the software object that occur during a period of time;

obtaining a functional flow based on the log, the functional flow indicating an order in which at least one function of the functions is performed by the software object during the period of time;

obtaining an analysis of function use based on the functional flow, the analysis indicating a respective frequency of use of each function of the at least one function, and the analysis being obtained by, at least, identifying a number of times each of the functions is present in the functional flow to obtain a frequency distribution of the functions;

obtaining weightings corresponding to the different portions of the computer code based on the analysis of function use, the weightings corresponding to the different portions of the computer code and indicating the respective frequency of use of each function of the functions corresponding to the different portions of the computer code; and performing an action set based on the weightings to update operation of the data processing system.

13. The non-transitory machine-readable medium of claim 12, wherein obtaining the log for the software object comprises:

monitoring activity of the software object over the period of time to obtain the events and corresponding timestamps for when each of the events is obtained; and recording the events and the corresponding timestamps to obtain the log.

14. The non-transitory machine-readable medium of claim 12, wherein the action set comprises:

identifying at least one portion of the computer code based on a frequency distribution of the different portions of the computer code;

updating the at least one portion of the computer code to obtain new computer code;

obtaining an updated software object based on the new computer code; and updating operation of the data processing system using the updated software object.

15. The non-transitory machine-readable medium of claim 14, wherein identifying the at least one portion of the computer code comprises:

rating the different portions of the computer code based on the frequency distribution of the different portions of the computer code using a rating system, wherein the rating system specifies at least three ratings for the different portions of the computer code based on the frequency of use of each of the different portions of the computer code.

16. A data processing system, comprising:

a processor, and a memory coupled to the processor to store instructions, which when executed by the processor, cause the processor to perform operations for managing a data processing system, the operations comprising:

obtaining a log for a software object, the software object being adapted to perform functions that correspond to different portions of computer code on which the software object is based, and the log specifying events regarding the software object that occur during a period of time;

obtaining a functional flow based on the log, the functional flow indicating an order in which at least one function of the functions is performed by the software object during the period of time;

obtaining an analysis of function use based on the functional flow, the analysis indicating a respective frequency of use of each function of the at least one function, and the analysis being obtained by, at least, identifying a number of times each of the functions is present in the functional flow to obtain a frequency distribution of the functions;

obtaining weightings corresponding to the different portions of the computer code based on the analysis of function use, the weightings corresponding to the different portions of the computer code and indicating the respective frequency of use of each function of the functions corresponding to the different portions of the computer code; and performing an action set based on the weightings to update operation of the data processing system.

17. The data processing system of claim 16, wherein obtaining the log for the software object comprises:

monitoring activity of the software object over the period of time to obtain the events and corresponding timestamps for when each of the events is obtained; and recording the events and the corresponding timestamps to obtain the log.

18. The data processing system of claim 16, wherein the action set comprises:

identifying at least one portion of the computer code based on a frequency distribution of the different portions of the computer code;

updating the at least one portion of the computer code to obtain new computer code;

obtaining an updated software object based on the new computer code; and updating operation of the data processing system using the updated software object.

19. The data processing system of claim 18, wherein identifying the at least one portion of the computer code comprises:

rating the different portions of the computer code based on the frequency distribution of the different portions of the computer code using a rating system,
wherein the rating system specifies at least three ratings for the different portions of the computer code based on the frequency of use of each of the different portions of the computer code.

20. The data processing system of claim 16, wherein the action set comprises:
identifying at least one portion of the computer code based on a frequency distribution of the different portions of the computer code; and
distributing information regarding the as least one portion of the computer code to an entity.

* * * * *